(12) United States Patent
Uekusa et al.

(10) Patent No.: US 6,285,517 B1
(45) Date of Patent: Sep. 4, 2001

(54) OBJECTIVE LENS DRIVING DEVICE

(75) Inventors: Nobuo Uekusa; Yasuhiro Terasaki; Noriyuki Kawano, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/702,688

(22) Filed: Nov. 1, 2000

Related U.S. Application Data

(63) Continuation of application No. 09/296,655, filed on Apr. 23, 1999, now Pat. No. 6,163,416.

(30) Foreign Application Priority Data

Apr. 24, 1998 (JP) .................................................. 10-129702
Apr. 24, 1998 (JP) .................................................. 10-129703
May 11, 1998 (JP) .................................................. 10-142073

(51) Int. Cl.[7] ...................................................... G02B 7/02
(52) U.S. Cl. ...................... 359/813; 359/814; 359/824; 369/44.14; 369/44.15; 369/247
(58) Field of Search ................................. 359/811, 813, 359/814, 824, 822, 823; 369/44.14, 44.15, 44.16, 247

(56) References Cited

U.S. PATENT DOCUMENTS

| | | | |
|---|---|---|---|
| 5,877,904 | 3/1999 | Kawano et al. | ...................... 359/824 |
| 5,892,628 | * 4/1999 | Ikari | ...................... 359/813 |
| 6,160,771 | 12/2000 | Kawano et al. | ...................... 369/44.15 |
| 6,163,416 | * 12/2000 | Uekusa et al. | ...................... 359/813 |

* cited by examiner

*Primary Examiner*—Loha Ben
(74) *Attorney, Agent, or Firm*—Oblon, Spivak, McClelland, Maier & Neustadt, P.C.

(57) ABSTRACT

An objective lens driver in which a movable portion 1 with an objective lens 11 is supported on a fixed portion by two groups of elastic supporting members each being horizontally bent which are disposed on both sides of the objective lens 11 such that each group of elastic supporting members are vertically arranged on each side of the objective lens, and the upper elastic supporting members of the groups of elastic supporting members are spaced from each other horizontally, is improved such that each group of elastic supporting members vertically arranged on each side of the objective lens are not parallel to each other. Further, damping material are fixedly disposed between both ends of the elastic supporting members and stuck onto the elastic supporting members, and the amount of the damping material on one side of the objective lens is different from that of the damping material on the other side of the objective lens, and a method of manufacturing the objective lens driver.

7 Claims, 18 Drawing Sheets

OBJECTIVE LENS DRIVING DEVICE

This application is a Continuation of application Ser. No. 09/296,655 filed on Apr. 23, 1999, now U.S. Pat. No. 6,163,416.

BACKGROUND OF THE INVENTION

1. Field of the Invention

The present invention relates to an optical pick-up device for optically writing information into and reading out the same from a recording medium layered on an optical disc by projecting a light beam onto the recording medium. More particularly, the invention relates to an objective lens driver, used for an optical pick-up device, in which a movable portion having an objective lens is supported by means of suspension wires.

2. Discussion of Background Art

Generally, an optical pick-up device is composed of an objective lens driver having an objective lens and an optical system for transmitting light to and receiving the same from the objective lens. The optical pick-up device is mounted on a mounting table of an optical system block.

A general objective lens driver, as shown in FIG. 15, includes a movable portion 1, a fixed portion 2, and four elastic supporting members 3. The movable portion 1 includes an objective lens 11, a focus coil 12 and a tracking coil 13. The fixed portion 2 includes a magnetic circuit (magnet and others) 21. The elastic supporting members 3 are fastened at both ends thereof to the movable portion 1 and the fixed portion 2, and support the movable portion 1 in a cantilever fashion. The elastic supporting members 3 being metal suspension wires are disposed such that pairs of elastic supporting members are respectively provided on both sides of the movable portion 1 with respect to the objective lens 11. One ends of the pairs of the elastic supporting members 3 are soldered to holder plates 15, while the other ends of them are soldered to a base plate 23. The holder plates 15 are provided on the right and left sides of a lens holder 14 holding the objective lens 11. The fixed portion 2 is disposed so that the elastic supporting members 3 are parallel to a tangential direction of the disc.

The movable portion 1 may be shifted in a focus direction (perpendicular to the disc surface) when current is fed to the focus coil 12, and in a tracking direction (radial direction of the disc) when current is fed to the tracking coil 13. A measure to damp vibrations of the movable portion 1 is taken. As well illustrated in FIG. 16, damper cases 24 are provided on the front side of the base plate 23 to which the other ends of the elastic supporting members 3 are fastened. The other ends of the elastic supporting members 3, as shown, are passed through the damper cases 24 and the base plate 23, and soldered to the outer side of the base plate 23. The damper cases 24 are filled with gel-like damping material 25. In this case, the elastic supporting members 3 placed in part are stuck with the damping material 25. When the movable portion vibrates, the elastic supporting members 3 move through the damping material within the damper cases. At this time, viscous flow of the damping material acts on the moving elastic supporting members, and the supporting members are deformed. The deformation of the supporting members and the viscous flow of the damping material are utilized for the damping of the vibrations of the movable portion. (This damping technique is disclosed in JP-A-2-232824.)

To secure an exact information writing/reading to and from the optical disc, it is required that the optical axis of the objective lens is perpendicular to the surface of the disc. If the optical axis of the objective lens is tilted with respect to the disc surface during a movement of the movable portion (including the objective lens) of the objective lens driver in the focus direction, coma occurs in the optical system and consequently a signal jitter increases. A tangential directional component and a radial directional component make up the tilt of the objective lens. To secure an exactness of the information writing/reading, tilts of those directional components need to be eliminated.

For this reason, in the objective lens driver, the objective lens is mounted on the mounting table such that the optical axis of the objective lens is perpendicular to the disc surface. To this end, the supporting mechanism of the movable portion is designed such that the angular relation of the objective lens of the disc surface is maintained irrespective of the moving directions of the movable portion, the focus direction and the tracking direction.

In the objective lens driver, referred to above, in which the movable portion is supported by the elastic supporting members, the perpendicularity of the optical axis of the objective lens to the disc surface is maintained irrespective of the moving direction of the movable portion if the elastic supporting members have equal lengths and the spatial intervals between both ends of the elastic supporting members are equal.

To prevent the movable portion 1, or the objective lens 11, from being tilted when the movable portion is moved in the focus direction or the radial direction, the background art mentioned above has the following construction: the distances between the fixing ends of the elastic supporting members 3 in the movable portion 1 and the fixing ends thereof in the fixed portion 2 are selected to be equal and those elastic supporting members 3 are disposed to be parallel to one another in the vertical and horizontal directions. Further, the amounts of the damping material 25 contained in the damper cases 24 are selected to be equal to each other on the assumption that the elastic supporting members 3 are fixed at predetermined positions. Spring constants of the elastic supporting members 3 are selected to be equal to one another. When the movable portion 1 is moved in the focus direction, it can be considered that a focus-directional drive force acts on the center of gravity of the movable portion 1. Hence, the gravity center position is coincident with the focus directional drive center position.

To suppress the resonance in a low frequency region, damping material is put around each wires in the objective lens driver. Use of only the damping material fails to satisfactorily suppress the resonance in a high frequency region by pitching or yawing, however. To cope with this, JP-A-7-105551 and JP-A-9-190636 disclose objective lens drivers in that with the intention of improvement of the high-frequency resonance suppression, the movable portion 1 is supported with the fixed portion 2 in a state that the elastic supporting members 3 are bent in advance in radial direction, as shown in FIG. 17.

In the structure where the elastic supporting members 3 are arcuately bent in advance, the movable portion 1 unavoidably tilts when the movable portion 1 is shifted in the focus direction, even if the spatial intervals between the fixing points of the four elastic supporting members 3 are set to be equal to one another, and those members are disposed strictly parallel to each other. In case where the elastic supporting members 3 are bent in the radial direction, for example, when the movable portion 1 is shifted in the focus direction, its tilting in the tangential direction increases.

Particularly when the damping resonating with high frequencies is increased by increasing a quantity of the bending of the elastic supporting members, a tilt of the movable portion 1 in the tangential direction increases. When the tilt of the movable portion 1, i.e., the tilt of the objective lens 11, increases, coma is produced and readout signal jitter increases.

Where the quantity of the bending of the elastic supporting members 3 is reduced with the intention of reducing the tilt of the movable portion 1 in the tangential direction when the movable portion 1 is shifted in the focus direction, the damping effect for the high frequency resonance is lowered. This is problematic when it is assembled into a system.

Thus, the decrease of the tilt of the movable portion 1 in the tangential direction contradicts the increase of the damping for the high frequency resonance suppression.

In the above-mentioned objective lens driver, when the mounting positions of the four elastic supporting members 3 are displaced from the correct ones, a problem arises. The problem arises even if one mounting position is displaced from the correct one. For example, when the space or distance between the upper and lower elastic supporting members 3 on the radial (+) side is different from that on the radial (−) side, a dynamic balance of the structure with respect to the objective lens is lost. When the movable portion 1, which is horizontal at the neutral position as shown in FIG. 19, is shifted in the focus direction, a moment is generated about the gravity center of the movable portion 1, and as shown in FIG. 20, the movable portion 1 is tilted in the radial direction. Under this condition, when the movable portion 1 is shifted in the focus direction, coma is produced and the jitter of a readout signal increases.

For this reason, to prevent the tilt of the movable portion in the radial direction, it is required that the elastic supporting members 3 are highly accurately positioned. It is very difficult to highly accurately position the elastic supporting members 3 in the manufacturing stage. Actually, the resultant products inevitably suffer from the tilt of the movable portions. A possible measure to correct this is to do over again the soldering of the elastic supporting members 3 already fastened by soldering. However, the measure is accompanied by the following disadvantages: production yield is degraded, perfect correction is not always achieved, and product reliability will be impaired at the soldering portions of the elastic supporting members 3.

Next, details of the shift of the movable portion 1 in the focus direction will be given. When a focus-directional drive force F causes the movable portion 1 to shift in the focus (+) direction (toward the disc) as shown in FIG. 21A, a force to cause the elastic supporting members 3L and 3R to return to their original positions acts on those members. Let spring constants of the elastic supporting members 3L and 3R be Kl and Kr. When the movable portion is shifted from the neutral position in the focus direction by a distance X, a force Fl ($=-Kl*X$) acts on the fixing terminal of the elastic supporting member 3L and a force Fr ($=-Kr*X$) acts on the fixing terminal of the elastic supporting member 3R. Rotational moments generated about the gravity center G of the movable portion 1, caused by those forces, is expressed by $$Ml=Fl*L, \text{ and } Mr=Fr*L$$

where L=distance between the gravity center G and the fixing terminal of each of the elastic supporting members 3L and 3R.

Those moments Ml and Mr are opposite to each other with respect to the gravity center G. As recalled, the spring constants of the rotational moments Ml and Mr are equal to each other. Hence, the rotational moment Ml that is caused about the gravity center by the force applied from the elastic supporting member 3R is equal to the rotational moment Mr caused by the elastic supporting member 3L. Therefore, the movable portion 1 is not rotated.

Then, let us consider a case that the movable portion 1 is shifted in the radial direction, specifically, it is shifted a distance "l" to the left. In this case, the gravity center G of the movable portion 1 is shifted a distance equal to the radial shift of 21" with respect to the focus-directional drive center position. As a result of the shift, the spring constants Kl and Kr of the elastic supporting members 3L and 3R remain unchanged, viz., those are equal to each other.

The focus-directional drive center position can be considered to be the center of the magnetic circuit 21 of the fixed portion 2. Then, if the movable portion is shifted in the focus direction after it is shifted the distance of the radial shift of "l", a shift of "l" is produced between the focus-directional drive center position on which the focus-directional drive force F acts and the gravity center G of the movable portion 1. As a consequence, a rotation moment Mf ($=F*l$) is generated about the gravity center G in the movable portion 1. The direction of the rotation moment Mf is a counter-clockwise direction when the movable portion-is shifted in the focus (+) direction (toward the disc) since the gravity center G is located on the left-hand side when it is viewed from the focus-directional drive center position on which the focus-directional drive force F acts. Therefore, the movable portion 1 is rotated in the counterclockwise direction. In contrast with the above case, when the movable portion is shifted in the focus (−) direction (apart from the disc), the direction of the rotation moment Mf is a clockwise direction. The movable portion 1 is turned in the clockwise direction.

This results in a radial-directional tilt of the movable portion 1. There is known a technique that to remove the tilt, the rotational moment is balanced when the focus-directional drive center position is radially shifted in a manner that a distribution of magnetic flux of the magnetic circuit is shaped like a twin-mountain configuration by dividing the magnetic circuit in the radial direction (disclosed in JP-A-8-50727, for example).

A complicated magnetic circuit is required for varying the focus-directional drive center position in accordance with a quantity of its shift. Use of the complicated magnetic circuit cannot reduce the rotational moment sufficiently, however. Therefore, the movable portion 1 is tilted in the radial direction at the time of the radial shift of the focus-directional drive center position. This results in coma in the optical system, and increase of the jitter of the readout signal.

SUMMARY OF THE INVENTION

Accordingly, an object of the present invention is to provide an objective lens driver of which an objective lens is not tilted with respect to the surface of an optical disc.

According to one aspect of the present invention is to provide an objective lens driver comprising: a movable portion with an objective lens; at least four elastic supporting members being fixedly attached at one ends to the movable portion while being vertically and horizontally arranged with respect to the objective lens, the elastic supporting members being bilaterally bent; and a fixed portion to which the other ends of the elastic supporting members are fixedly attached; wherein the elastic supporting members vertically arranged are not in parallel to each other.

The thus improved structure reduces a tilt of the movable portion in the tangential direction that is caused when the movable portion is shifted in the focus direction.

According to another aspect of the present invention, there is an objective lens driver comprising: a movable portion with an objective lens; at least four elastic supporting members being fixedly attached at one ends to the movable portion while being vertically and horizontally arranged with respect to the objective lens; and a fixed portion to which the other ends of the elastic supporting members are fixedly attached; wherein damping material are fixedly disposed between both ends of the elastic supporting members and stuck onto the elastic supporting members, and the amount of the damping material on one side of the objective lens is different from that of the damping material on the other side of the objective lens.

In the thus objective lens driver thus constructed, when the movable portion is shifted to the radial (+) side, and when the movable portion is shifted to the radial (−) side, the damping material is additionally put into the damper case on the radial (+) side in accordance with a tilt of the movable portion, viz., the amount of the damping material on one side is different from that on the other side. This unique structure reduces a tilt of the movable portion in the tangential direction that is caused when the movable portion is shifted in the focus direction.

According to another aspect of the invention, there is provided an objective lens driver comprising: a movable portion with an objective lens; at least four elastic supporting members being fixedly attached at one ends to the movable portion while being vertically and horizontally arranged with respect to the objective lens; and a fixed portion to which the other ends of the elastic supporting members are fixedly attached; wherein when the movable portion is shifted in the radial direction, the spring constants of the elastic supporting members are varied.

With such a construction, when the movable portion is shifted in the radial direction, the spring constants of the elastic supporting members are varied. When the movable portion is shifted in the focus direction, forces causing-elastic supporting members to restore their original shape are generated, and generate rotational moments about the gravity center of the movable portion. The rotational moments cancel out a rotational moment generated when the focus-directional drive center position is shifted from the gravity center.

DESCRIPTION OF THE PREFERRED EMBODIMENTS

<First Embodiment>

Figure 1:
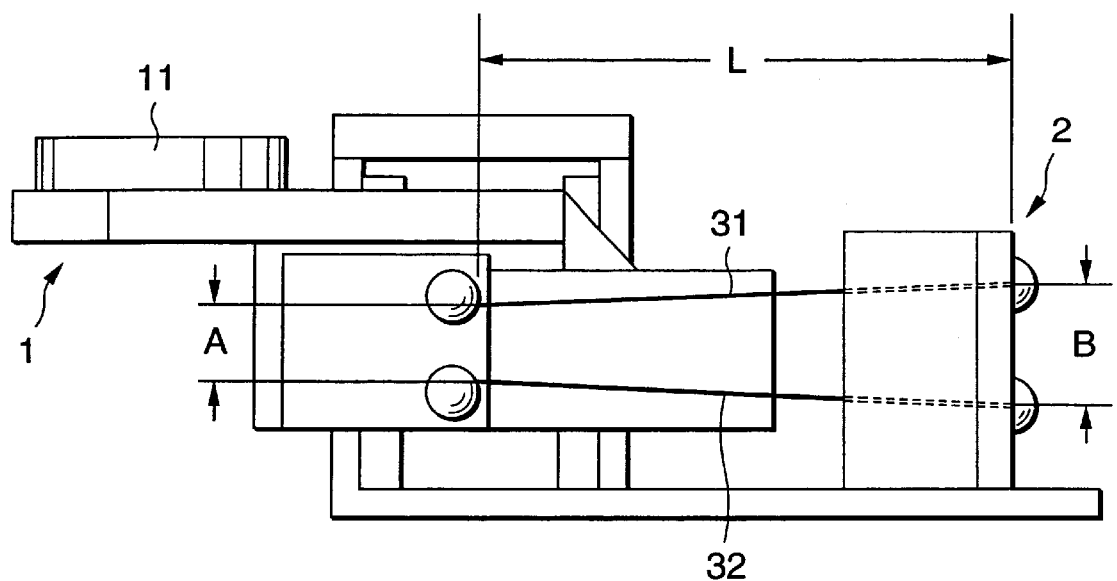
FIG. 1 is a side view showing a first embodiment of the present invention.

FIG. 1 is a diagram schematically showing an objective lens driver in use for an optical pick-up device which is an embodiment of the present invention. In FIG. 1, reference numeral 31 is an upper elastic member; 32 is a lower elastic member 32; A is a fixed interval between the upper and lower elastic members 31 and 32 in a movable portion 1 of the objective lens driver; and B is a fixed interval between the upper and lower elastic members 31 and 32 in a fixed portion 2 of the objective lens driver.

Figure 2:
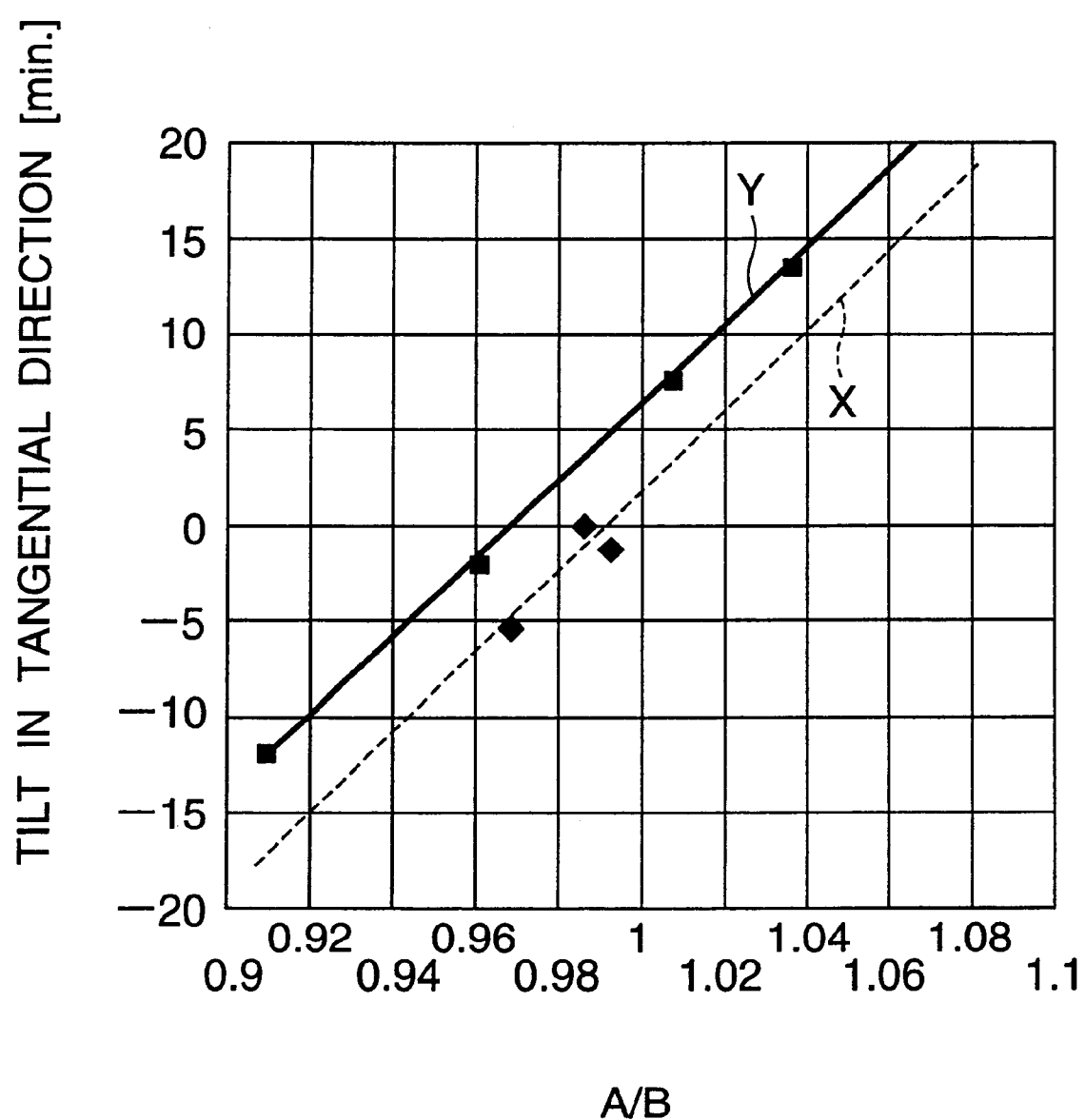
FIG. 2 is a graph showing a variation of a tilt of the movable portion 1 in the tangential direction with respect to a ratio of A/B (A is a fixed interval A between the upper and lower elastic supporting members on a movable portion, and B is a fixed interval B between the corresponding ones on a fixed portion)
Figure 17:
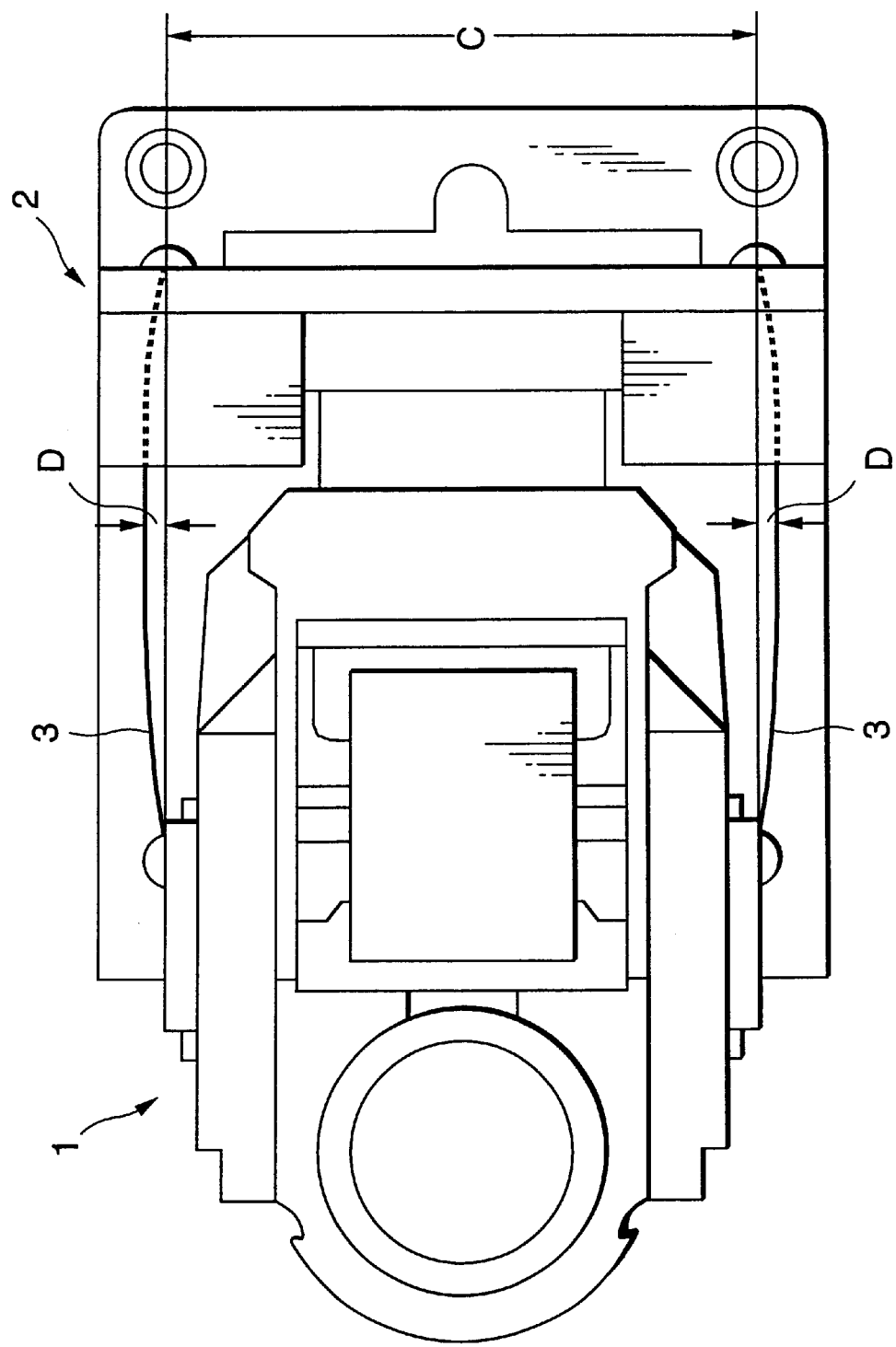
FIG. 17 is a plan view showing the conventional objective lens driver.
Figure 18:
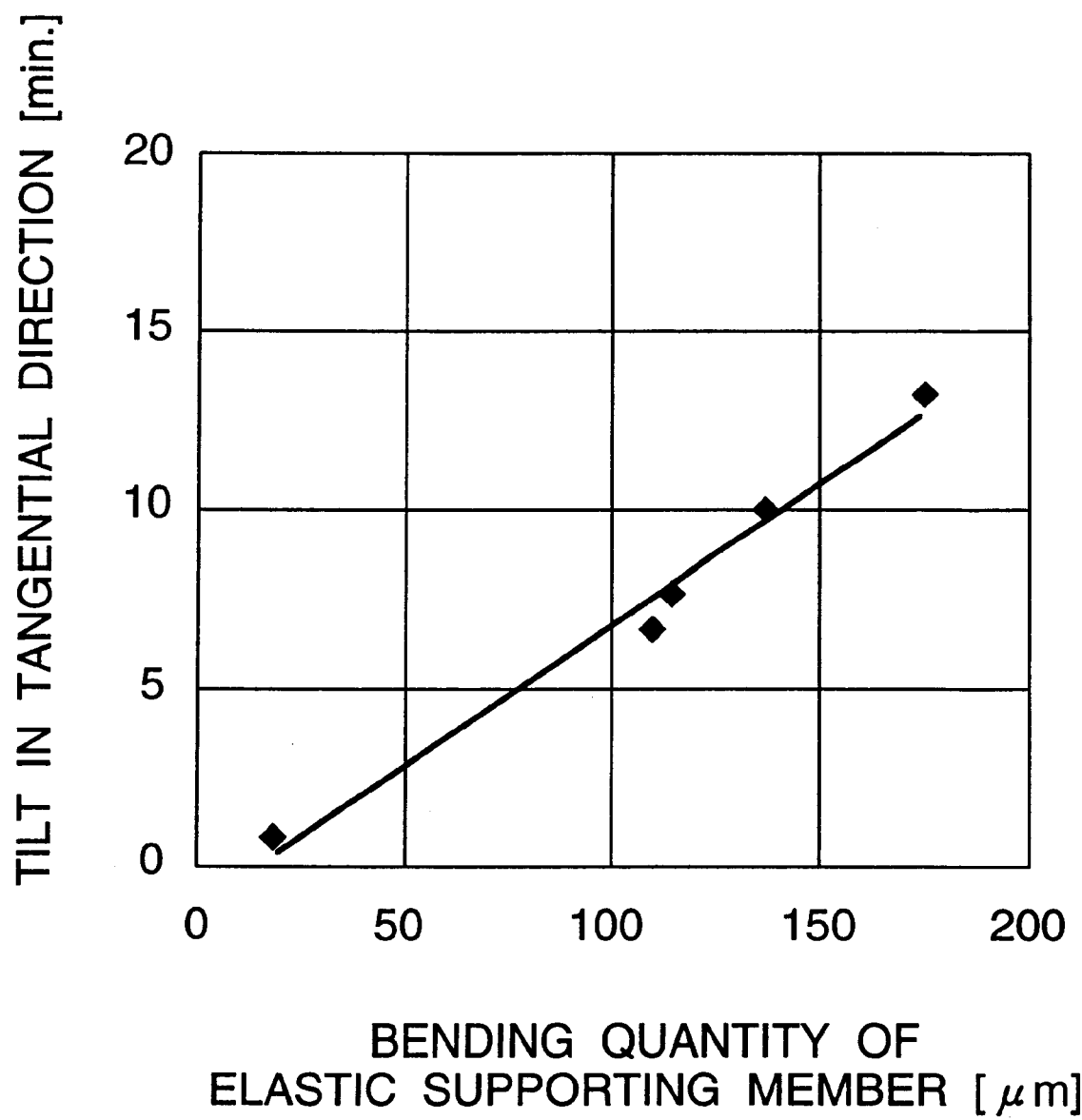
FIG. 18 is a graph showing a variation of a tangential-directional tilt of the movable portion with respect to a bending quantity of an elastic supporting member.
Figure 19:
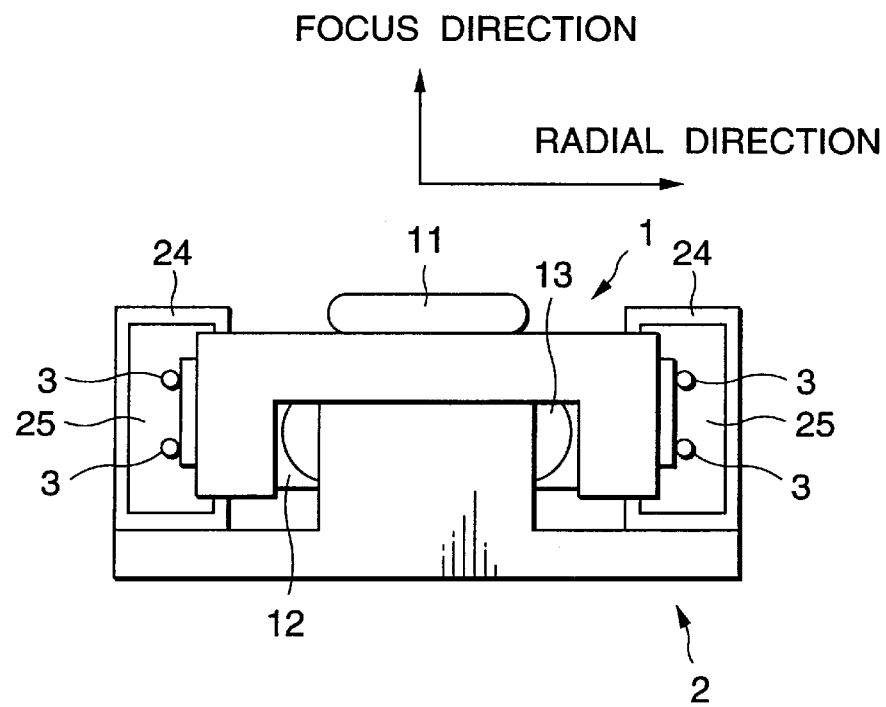
FIG. 19 is a diagram showing a state of the movable portion at the neutral position.
Figure 20:
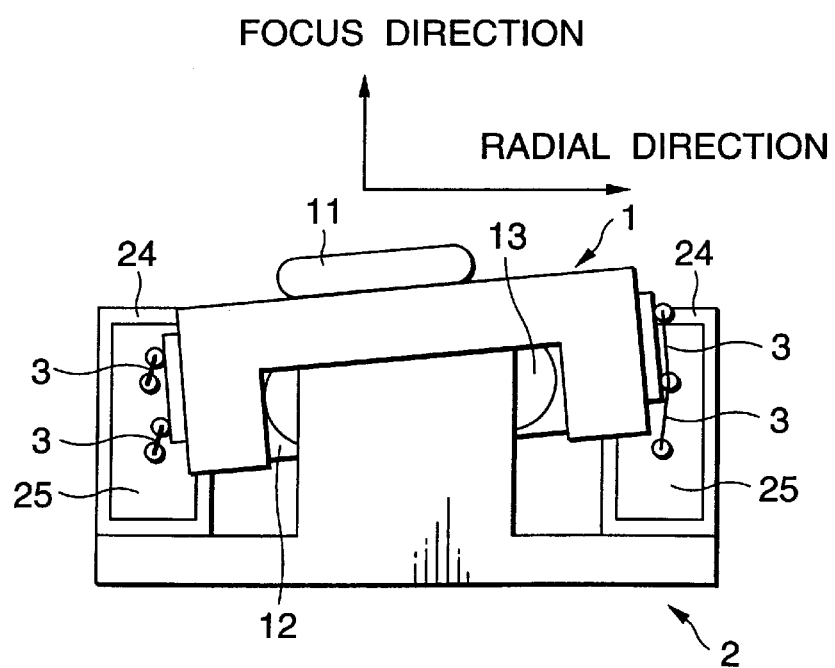
FIG. 20 is a front view showing a state of the movable portion when it is tilted to the focus (+) side.
Figure 21A:
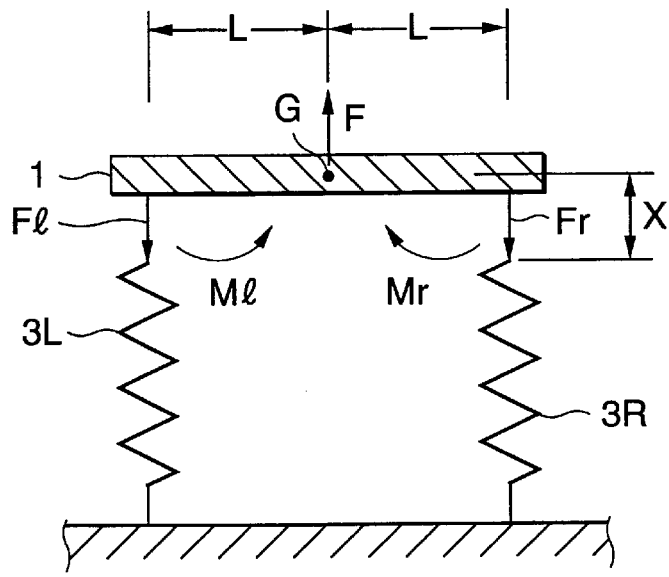
FIG. 21A is a diagram showing a model of the movable portion in the conventional objective lens driver when it is tilted only in the focus direction.
Figure 21B:
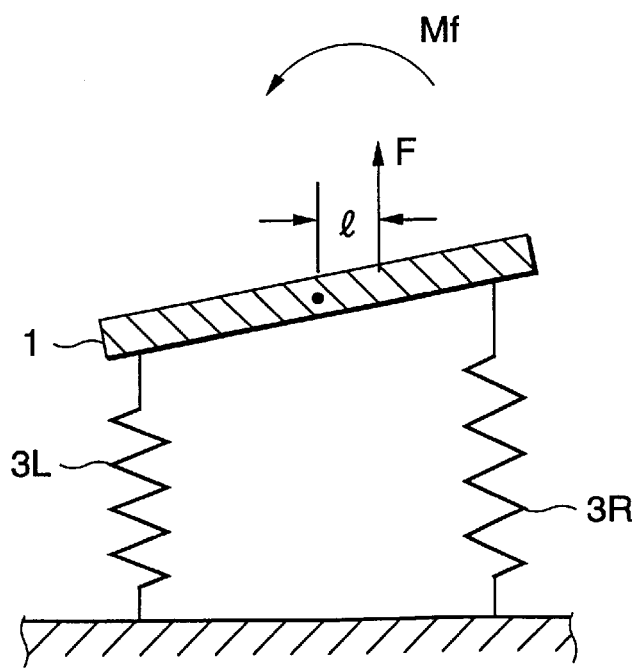
FIG. 21B is a diagram showing a model of the movable portion in the conventional objective lens driver when it is tilted in both the focus and radial directions.

FIG. 2 shows a variation of a tilt of the movable portion 1 in the tangential direction when the movable portion 1 is shifted +0.5 mm in the focus direction (from the neutral position to the disc) in a manner that the fixed interval A is varied while the fixed interval B is fixed at a given value. In this case, wires of phosphor bronze, 0.08 mm in diameter, were used for the elastic members 31 and 32. A horizontal interval C between the right and left elastic supporting members 3, viz., those members when viewed in the radial direction was 10.6 mm; an interval L between the fixing points of the elastic members 31 and 32 was 9.0 mm; and the fixed interval B was 1.9 mm. Also in FIG. 2, X represents data gathered when a quantity D of bending of the elastic supporting member was set at 0, and Y represents data when the bending quantity D was set at approximately 130 $\mu$m. For the meanings of the horizontal interval C and the bending quantity D, reference is made to FIG. 17. As seen from the graph, where A/B=1 and the bending quantity D=0, a tilt of the movable portion 1 in the tangential direction is +2 arcmin (sign + means a tilt of the movable portion when it is shifted to the disc). Where A/B=1 and the bending quantity D=approximately 130 $\mu$m, a tilt of the movable portion is +7 arcmin. In this case, the movable portion is greatly tilted in the tangential direction. Where A/B=0.97, it is little tilted in the tangential direction. The further a value difference of A/B from 0.97 increases, the larger the tilt in the tangential direction is.

As seen from this fact, it is possible to prevent the increase of the tilt of the movable portion in the tangential direction even if the elastic supporting members 3 is bent and the movable portion 1 is shifted in the focus direction if the fixed intervals A and B are related as A<B, and the ratio of them, A/B, is properly selected so as to compensate for a tilt of the movable portion determined by the bending quantity D of the elastic supporting member 3. Therefore, the damping effect for the resonance at high frequencies can be enhanced by setting the bending quantity D at a value irrespective of the tilt of the movable portion 1.

Description has been made about the objective lens driver in which the movable portion with the objective lens is supported on the fixed portion in a cantilever fashion by two pairs of elastic supporting members. Those elastic supporting members are disposed on both sides of the objective lens such that each pair of elastic supporting members are vertically arranged as the upper and lower elastic supporting members on each side of the objective lens, and the upper elastic supporting members of those pairs of the elastic supporting members are horizontally spaced from each other. It is readily understood that the invention is applicable to the objective lens driver in which the movable portion is supported on the fixed portion in a cantilever fashion by two trios of elastic supporting members. Those elastic supporting members are disposed on both sides of the objective lens such that each trio of elastic supporting members are vertically arranged as the upper, middle and lower elastic supporting members on each side of the objective lens, and the upper elastic supporting members of those pairs of elastic supporting members are spaced from each other horizontally. While the movable portion is supported on the fixed portion in a cantilever fashion in the above-mentioned embodiment, the former may be supported at both ends with the latter. In the above-mentioned embodiment, the like members are used for the upper and lower elastic members 31 and 32, which are vertically arranged on each side of the objective lens and horizontally bent. The elastic supporting members that are bent at different curvatures may be used instead of the above ones. Further, the elastic supporting members that are horizontally and vertically bent may also be used for the elastic members 31 and 32. In the above-mentioned embodiment, the fixing points of the upper and lower elastic members 31 and 32 on the movable portion 1 are vertically aligned with each other. If necessary, those fixing points may be not aligned with each other.

An objective lens driver in which a movable portion with an objective lens is supported on a fixed portion by two groups of elastic supporting members each being horizontally bent which are disposed on both sides of the objective lens such that each group of elastic supporting members are vertically arranged on each side of the objective lens, and the upper elastic supporting members of the groups of elastic supporting members are spaced from each other horizontally, is improved such that each group of elastic supporting members vertically arranged on each side of the objective lens are not parallel to each other.

The thus improved structure reduces a tilt of the movable portion in the tangential direction that is caused when the movable portion is shifted in the focus direction, and enables a designer to properly select a bending quantity of each elastic supporting member irrespective of the tilt of the movable portion. Therefore, the objective lens driver of the invention reduces a tilt of the movable portion in the tangential direction caused when the movable portion is shifted in the focus direction, and enhances the damping effect for the resonance at high frequencies.

<Second Embodiment>

Figure 3:
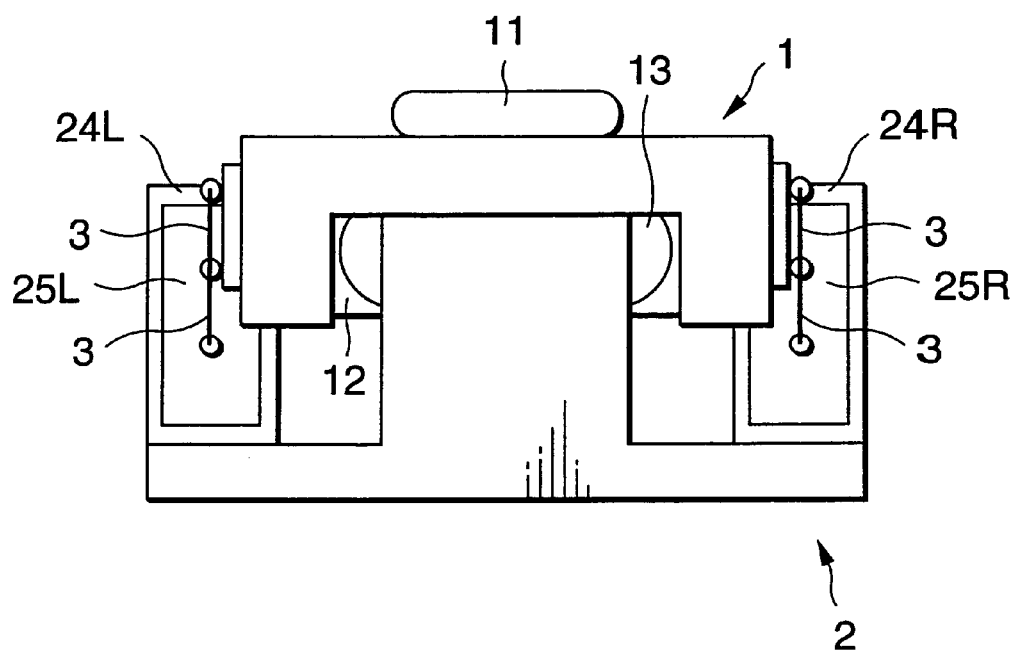
FIG. 3 is a side view showing a second embodiment of the present invention.

FIG. 3 is a diagram showing a second embodiment of the present invention. In FIG. 3, reference numeral 1 is a movable portion; 2 is a fixed portion; 3 is an elastic supporting member; 24L is a left-hand (left=radial (−) side) damper case; 24R is a right-hand (right=radial (+) side) damper case; 25L is a damping material filling the left-hand damper case 24L; and 25R is a damping material filling the right-hand damper case 24R.

Figure 4:
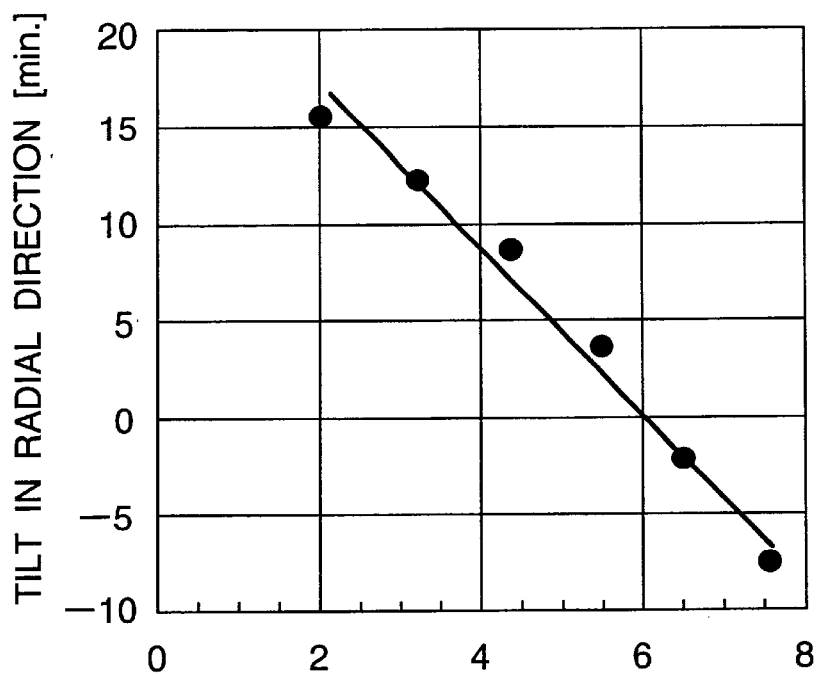
FIG. 4 is a graph showing a variation of a radial directional tilt of the movable portion with respect to an amount of damping material.

A quantity of additional damping material and a tilt angle that may be corrected will be described. An experiment was conducted for obtaining a relationship between a quantity of additional damping material and a tilt angle that may be corrected. The result of the experiment is shown in FIG. 4. This relationship depends on such various factors as kinds and spring constants of the elastic supporting members, the volumes of the right- and left-hand damper case 24R and 24L, and kinds and initial filling quantities of the damping materials 25R and 25L. A typical relationship will be described for ease of explanation. Various materials may be used for the damping materials 25R and 25L. Of those materials, gel-like materials, particularly gel-like materials of silicone or denatured acrylate are preferable for the damping materials. In the description to follow, a gel-like damping material of silicone will be used for the damping materials 25R and 25L.

Four wires of 80 $\mu$m in diameter were used for the elastic supporting members 3. A length of the elastic supporting member ranging from the fixing point on the movable portion 1 to the fixing point on the fixed portion 2 was 9 mm. The right- and left-hand damper cases 24R and 24L are each capable of receiving damping material of 7.6 mg. One damper case 24R or 24L was used for two wires, upper and lower wires. A tilt of the movable portion in the radial direction, which was caused when the movable portion was shifted +0.5mm in the focus direction, was measured. In the measurement, the damping material 25R of 6.1 mg was put into the right-hand damper case 24R, and the damping material 25L was gradually put into the left-hand damper case 24L during the measurement.

In the graph of FIG. 4, the abscissa represents a quantity of the damping material 25L put into the left-hand damper case 24L, and the ordinate represents a tilt of the movable portion in the radial direction, which was caused when the movable portion was shifted +0.5 mm in the focus direction. From the graph, it is seen that the movable portion descends as the quantity of the damping material is large. When the quantity of the damping material 25R on the right side (=radial (+) side) is larger than that of the damping material 25L on the left side (=radial (−) side), the right end of the movable portion descends (tilts to the radial (+) side). In the reverse case, the left end of the movable portion descends (tilts to the radial (−) side).

The relationship between the quantity of additional damping material and the radial-directional tilt is substantially linear. A proportional constant of the relationship can be calculated as 4.2 arcmin/mg.

Figure 5:
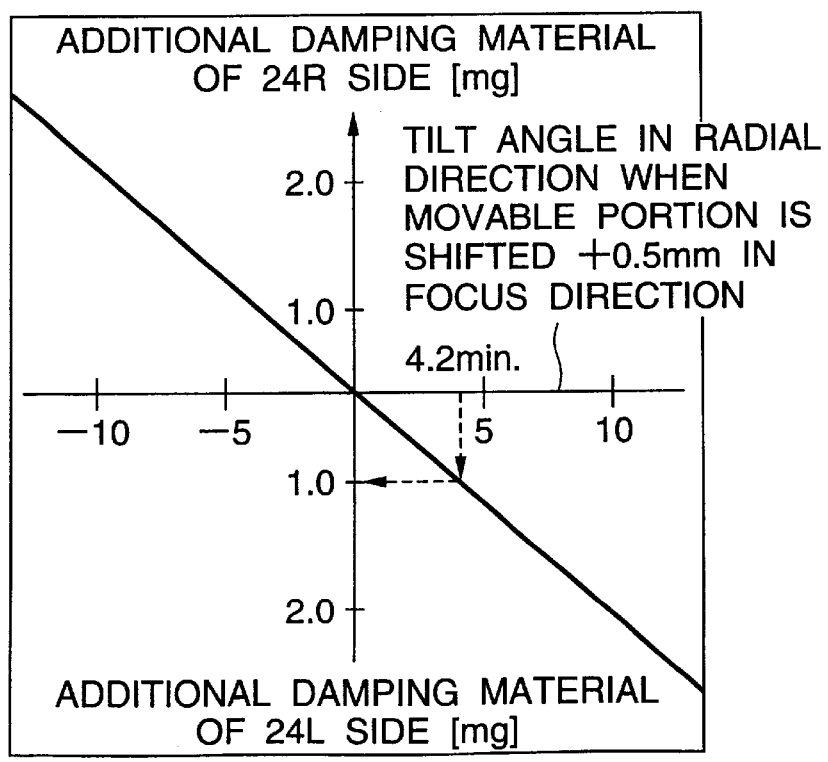
FIG. 5 is a graph showing a relationship between an amount of damping material to be added and a tilt angle that may be corrected.

The relationship between a quantity of additional damping material and a tilt angle (FIG. 5) that may be corrected may be derived from the measurement results of FIG. 4. In case where a sample manufactured is shifted +0.5 mm in the focus direction and the movable portion 1 is tilted to the radial (+) side at angle of 4.2 arcmin, the tilt of the movable portion 1 can be corrected and the tilt angle can be reduced to zero (0) by additionally putting the damping material of 1.0 mg into the left-hand damper case 24L of the radial (−) side.

As seen from the above, the tilt of the movable portion 1 in the radial direction can be removed in the following manner. Equal to substantially equal amounts of damping material is put into the right-hand damper cases 24R and 24L. A tilt of the movable portion 1 produced when it is shifted +0.5 mm in the focus direction is measured. Damping material is additionally put into either of the right- and left-hand damper cases 24R and 24L to make the amounts of the damping materials 25R and 25L different.

In an alternative, the right- and left-hand damper cases 24R and 24L are empty at first. The operator puts the damping material into those damper cases while measuring a tilt characteristic of the objective lens. Finally, the amount of the damping material in the right-hand damper case 24R is made different from that in the left-hand damper case 24L.

Figure 6:
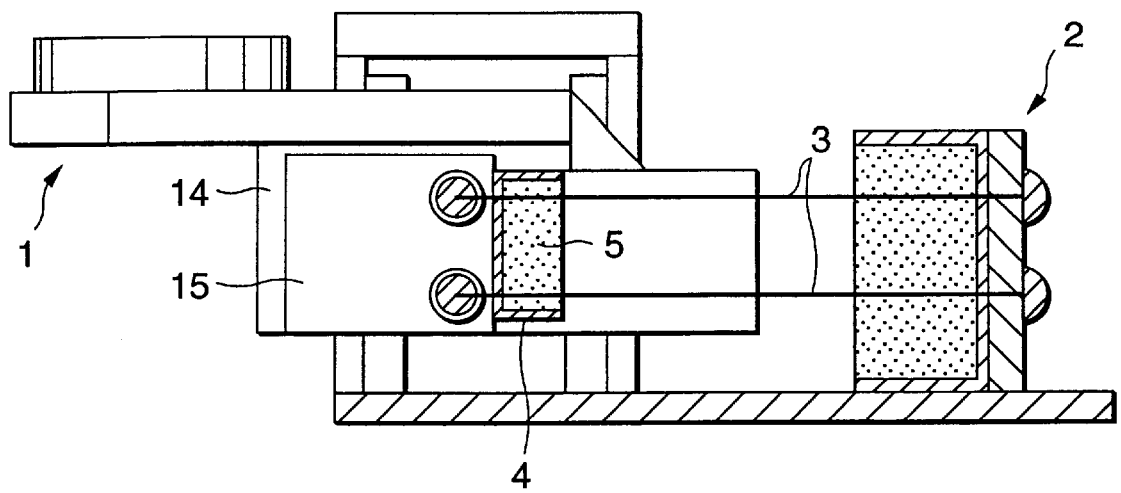
FIG. 6 is a diagram showing another second embodiment of the invention.

In the instances mentioned above, the tilt adjusting damping material is additionally put into the right-hand damper case 24R or 24L. Another alternative is shown in FIG. 6. As shown, tilt-adjusting damper cases 4 are provided on both sides of a movable portion 1. Tilt adjusting material is put into one or both the damper cases 4. In this instance, the damper cases 4 are mounted on both side surfaces of a lens holder 14. If necessary, those cases 4 may be fastened onto holder plates 15. One tilt-adjusting damper case 4 is provided for two elastic supporting members, the upper and lower elastic supporting members. The tilt-adjusting damper case may be provided for-the elastic supporting member in one-to-one correspondence fashion. The tilt-adjusting damping material 5 is additionally put into both the tilt-adjusting damper cases 4. This is based on the assumption that no tilt-adjusting damping material 5 is put into the tilt-adjusting damper cases 4 all along. When the tilt-adjusting damping material 5 is already put in the tilt-adjusting damper cases, adding of the tilt-adjusting damping material 5 to the damping material already present in either of the tilt-adjusting damper cases 4 will do.

Figure 7:
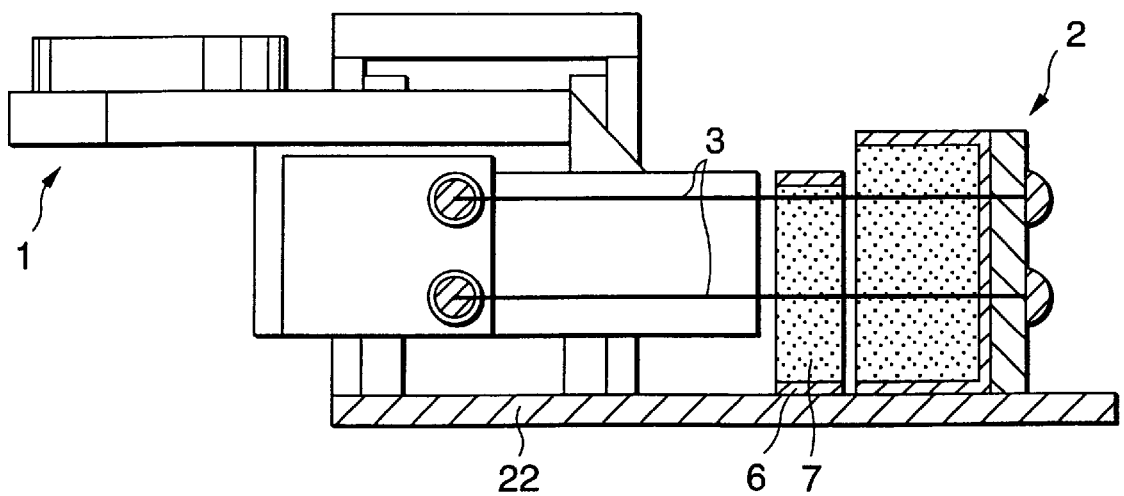
FIG. 7 is a diagram showing yet another second embodiment of the invention.

Another tilt-adjusting contrivance is illustrated in FIG. 7. As shown, tilt-adjusting damper cases 6 are separately provided on the side surfaces of the base plate 22 of the fixed portion 2. Tilt-adjusting damping material 7 is additionally applied to one or both of the tilt-adjusting damper cases 6. In this tilt-adjusting contrivance, one tilt-adjusting damper case 6 is provided for two elastic supporting members 3, the upper and lower elastic supporting members. If required, the tilt-adjusting damper case 6 is provided for each of the elastic supporting members 3.

Figure 8:
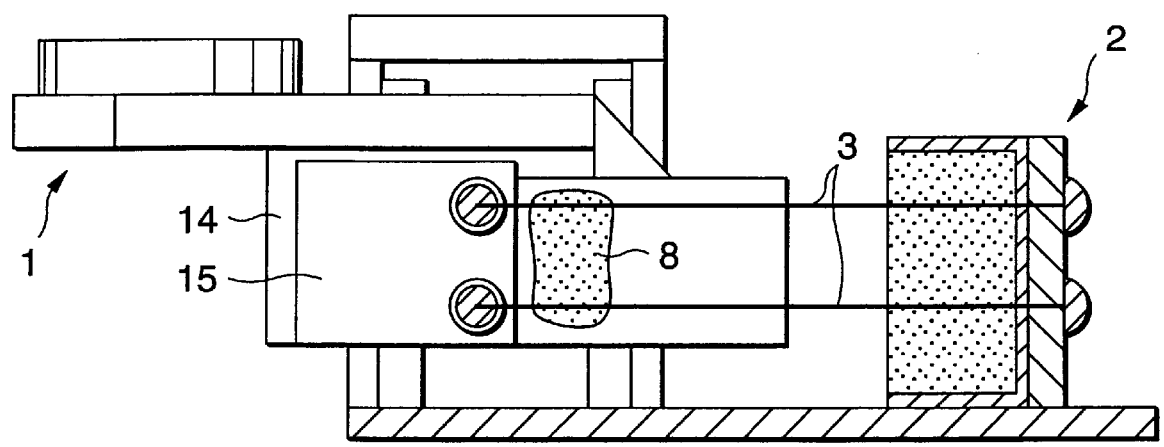
FIG. 8 is a diagram showing still another second embodiment of the invention.

An additional tilt-adjusting contrivance is shown in FIG. 8. In this tilt-adjusting contrivance, the tilt-adjusting damper cases are not used, but tilt-adjusting damping material 8 is directly applied to the elastic supporting members 3 by coating. The tilt-adjusting damping material 8, together with the elastic supporting members 3, is held by the movable portion 1. Places onto which the tilt-adjusting damping material 8 is stuck are the side surfaces of the lens holder 14. If necessary, the holder plates 15 are extended, and the tilt-adjusting damping material may be applied to the extended holder plates 15. In the illustrated instance, the two, upper and lower elastic supporting members are secured onto the same place, or the movable portion 1. If necessary, the upper elastic supporting members may be stuck to the movable portion 1 and the lower elastic supporting members may be stuck onto the fixed portion 2, and vice versa. Further, the tilt-adjusting damping material 8 may be applied to one or both of the elastic supporting members 3.

A kind of the tilt-adjusting damping material may be different from that of the damping material already filled in.

The embodiment uses two types of damping materials. The first type of damping material is first loaded into the right- or left-hand damper case 24R or 24L, and the second type of damping material is additionally loaded into the damper case. Therefore, the amount of damping material to be loaded into the right- and left-hand damper case 24R or 24L is reduced. The fact implies that the depth of the right- and left-hand damper case 24R or 24L may be reduced, and hence its size in the tangential direction may be reduced.

A mechanical unbalance, e.g., difference of the interval between the upper and lower elastic supporting members 3 on the radial (+) side portion of the movable portion 1 from that on the radial (−) side portion thereof, can be removed by adjusting the spring constant or constants of the elastic supporting member or members. To the adjustment, the tilt-adjusting damping material is additionally loaded into the damper case or cases. If so adjusted, the elastic supporting members 3 on the radial (+) side are uniformized with those on the radial (−) side. As a result, when the movable portion is shifted in the focus direction, the elastic supporting members uniformly act and move in parallel with each other. Hence, the movable portion 1 never tilts in the radial direction.

In the description thus far made, the tilt of the movable portion is caused by dimensional errors of the elastic supporting members. However, the movable portion will be tilted by other causes, for example, when the magnet is shifted in the radial direction. The tilt-adjusting means mentioned above may be applied to the correction of the tilts produced by the latter cause.

There is a case where the movable portion of the product tends to tilt because of the characteristic of the tool used for assembling the product. The tilt-adjusting means of the invention effectively operates to correct such a tilt peculiar to the product without correcting the tool characteristic. In this case, different but properly selected amounts of damping material are loaded into to the damper cases.

Description has been made about the objective lens driver in which the movable portion with the objective lens is supported on the fixed portion in a cantilever fashion by two pairs of elastic supporting members. Those elastic supporting members are disposed on both sides of the objective lens such that each pair of elastic supporting members are vertically arranged as the upper and lower elastic supporting members on each side of the objective lens and the upper elastic supporting members of those pairs of the elastic supporting members are horizontally spaced from each other. It is readily understood that the invention is applicable to the objective lens driver in which the movable portion is supported on the fixed portion in a cantilever fashion by two trios of elastic supporting members. Those elastic supporting members are disposed on both sides of the objective lens such that each trio of elastic supporting members are vertically arranged as the upper, middle and lower elastic supporting members on each side of the objective lens, and the upper elastic supporting members of those pairs of elastic supporting members are spaced from each other horizontally. While the movable portion is supported on the fixed portion in a cantilever fashion in the above-mentioned embodiment, the former may be supported at both ends with the latter.

The present invention, which has been described, is incorporated into the objective lens driver in which even if the movable portion 1 is shifted in the focus direction, the movable portion 1 is not tilted in the radial direction. The invention may be incorporated into a method of manufacturing the objective lens driver in which even if the movable portion 1 is shifted in the focus direction, the movable portion 1 is not tilted in the radial direction. There is provided a manufacturing method of an objective lens driver in which a movable portion with an objective lens is supported on a fixed portion by two groups of elastic supporting members which are disposed on both sides of the objective lens such that each group of elastic supporting members are vertically arranged on each side of the objective lens, and the upper elastic supporting members of the groups of elastic supporting members are spaced from each other horizontally, the manufacturing method wherein after an objective lens tilt characteristic is inspected, tilt-adjusting damping material is added to damping material stuck onto the elastic supporting members fixed at both ends and arranged therebetween in accordance with a detected tilt of the objective lens.

As seen from the foregoing description, the present invention may be defined by an objective lens driver in which a movable portion with an objective lens is supported on a fixed portion by two groups of elastic supporting members which are disposed on both sides of the objective lens such that each group of elastic supporting members are vertically arranged on each side of the objective lens, and the upper elastic supporting members of the groups of elastic supporting members are spaced from each other horizontally, the improvement being characterized in that damping material are fixedly disposed between both ends of the elastic supporting members and stuck onto the elastic supporting members, and the amount of the damping material on one side of the objective lens is different from that of the damping material on the other side of the objective lens, and a method of manufacturing the objective lens driver. With such a construction, even if the movable portion 1 is shifted in the focus direction, the movable portion 1 is not tilted in the radial direction. The novel and unique construction of the invention accrues to the following advantages. There is no need for the work of accurately positioning the elastic supporting members for preventing the objective lens tilt. There is eliminated the work to do over again the soldering of the elastic supporting members 3 already fastened by soldering, the work essential to the accurate positioning. Further, there is no need for the apprehension of the reliability on the soldering portions.

<Third Embodiment>

Figure 9A:
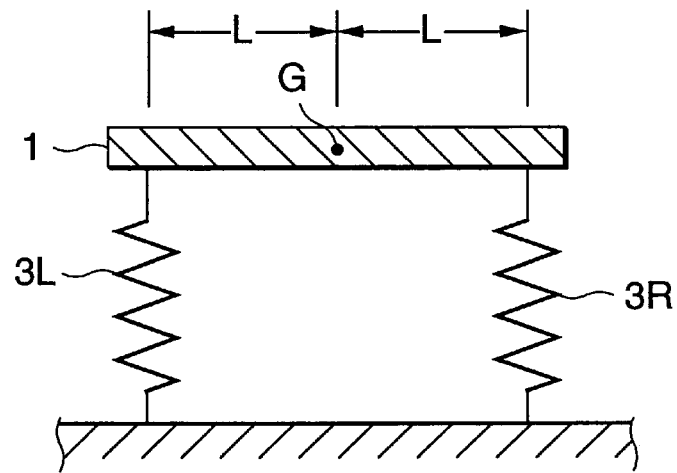
FIG. 9A is diagram showing a model of a third embodiment of the invention where the movable portion is not tilted in the radial direction and the focus direction.
Figure 9B:
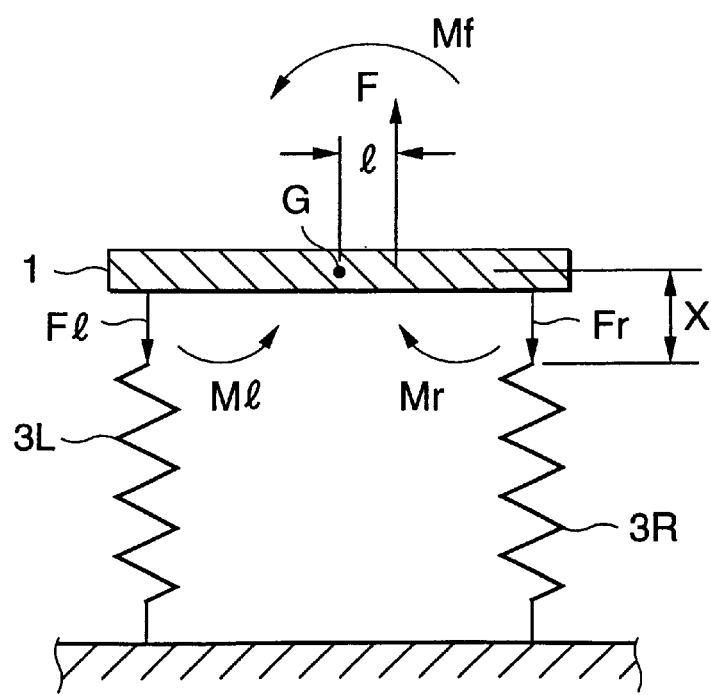
FIG. 9B is diagram showing a model of a third embodiment of the invention where the movable portion is tilted in the radial direction and the focus direction.

FIG. 9 shows a diagram useful in explaining a third embodiment of the present invention. In the figure, reference numeral 1 is a movable portion; 3L is a left-hand elastic supporting member; and 3R is a right-hand elastic supporting member 3R.

Figure 10:
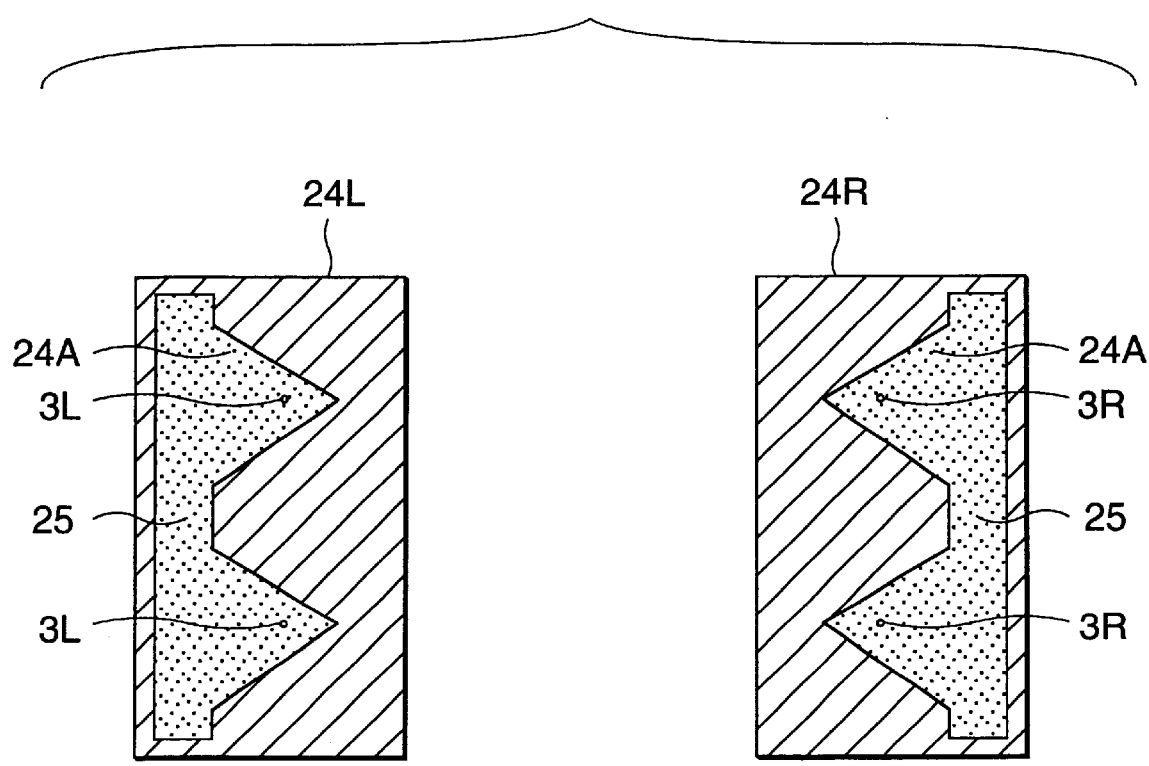
FIG. 10 is a front view showing a damper case used in the third embodiment.
Figure 11:
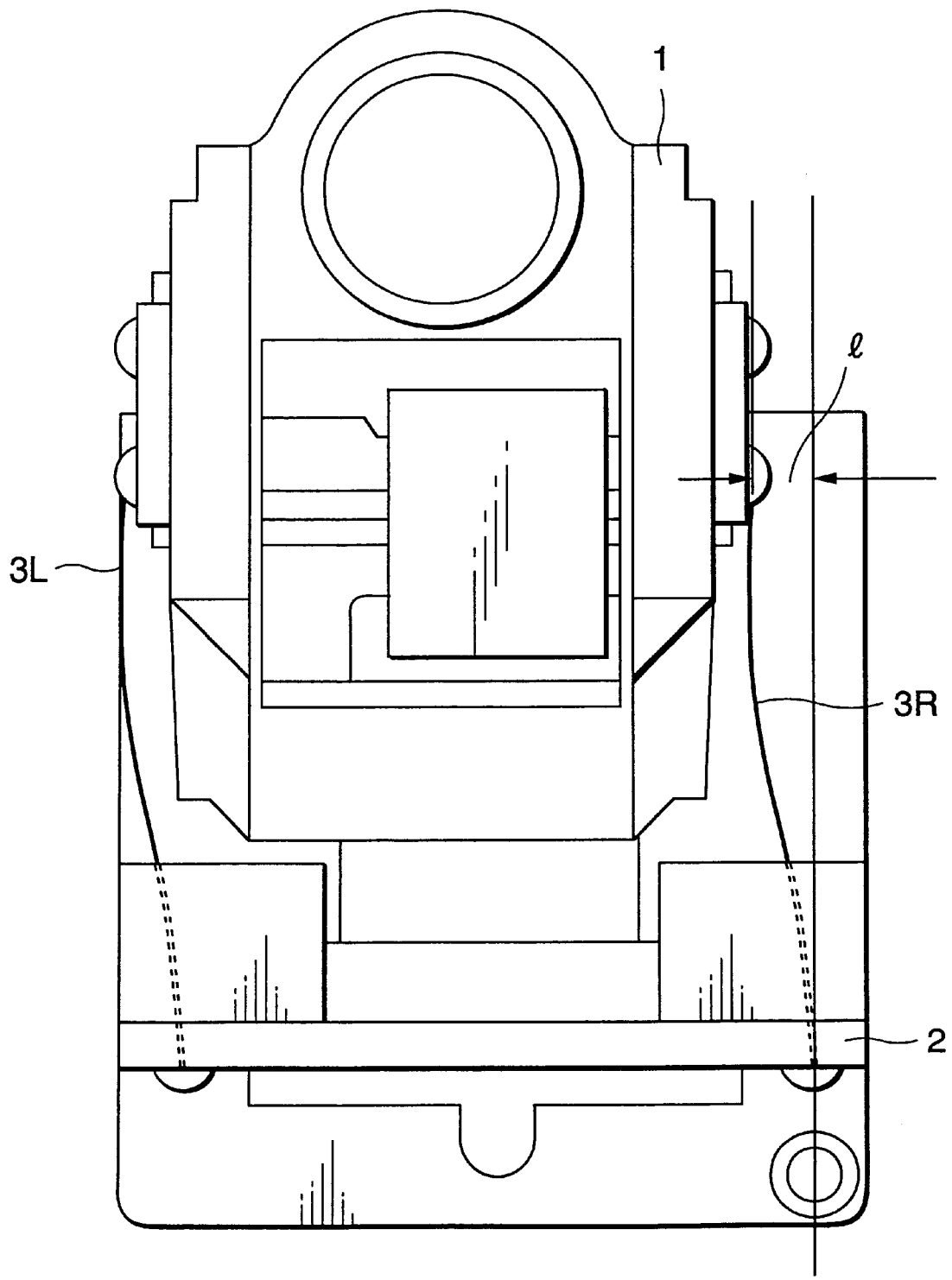
FIG. 11 is a plan view showing an objective lens driver when a movable portion is shifted in the radial direction.

The right- and left-hand damper cases 24R and 24L are shaped to be bilaterally symmetrical with each other as shown in FIG. 10. A portion 24A of the right-hand damper case 24R (24L) at which the left-hand elastic supporting member 3R (3L) is to be placed is shaped like V; the inner side of the portion 24A narrows in the focus direction, and the outer side thereof expands in the focus direction. With the thus shaped portions 24A, when the movable portion 1 is shifted in the radial direction, the amount of damping material 25 loaded into between the right-hand damper case 24R and the right-hand elastic supporting member 3R becomes different from that of the damping material loaded into between the left-hand damper case 24L and the left-hand elastic supporting member 3L.

Figure 12A:
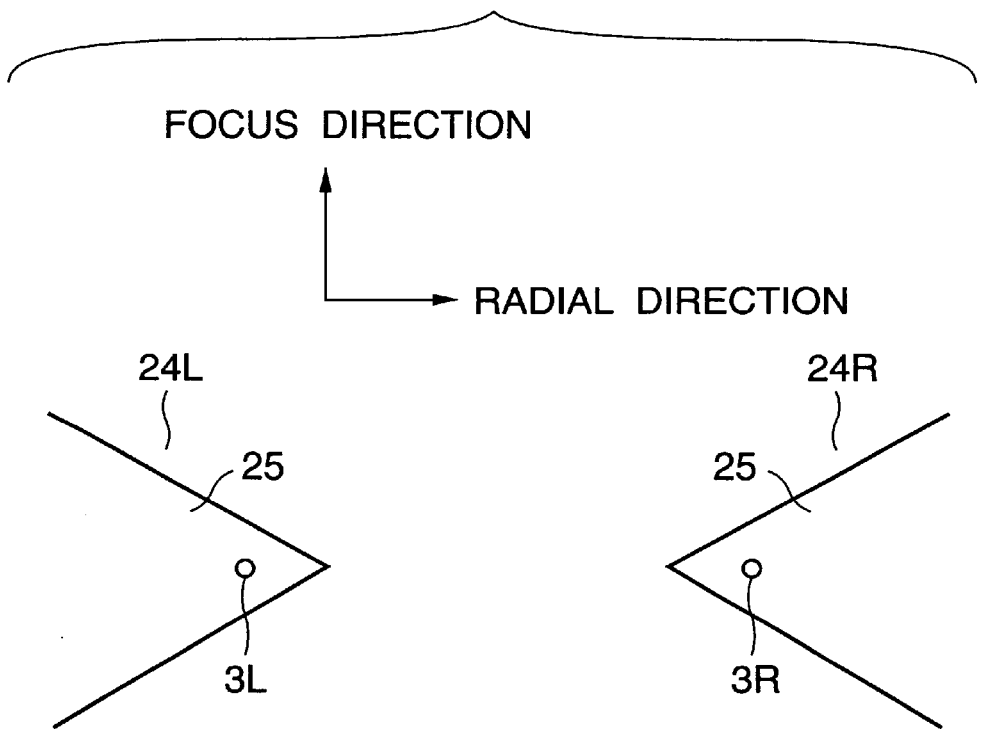
FIG. 12A is a diagram showing a state of elastic supporting members before the movable portion is shifted in the radial direction.
Figure 12B:
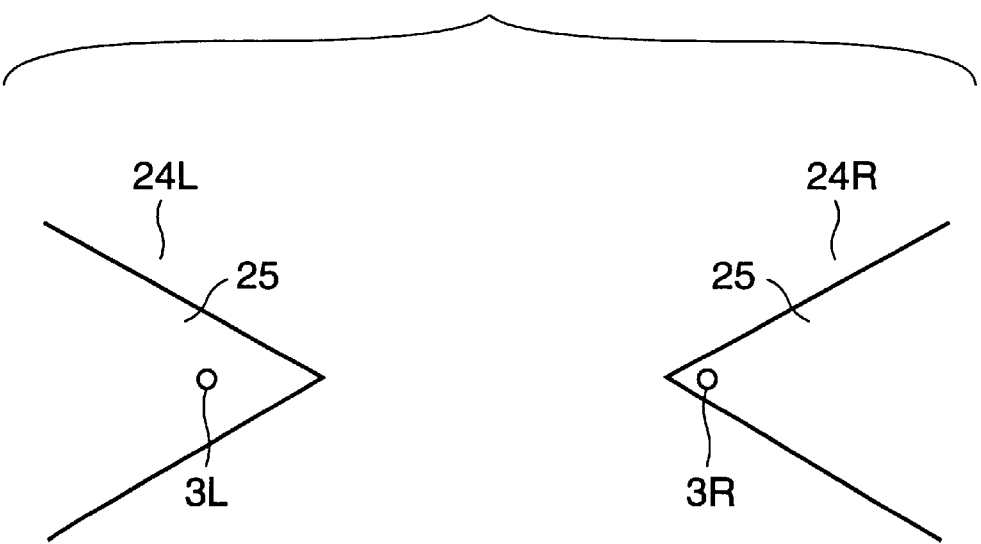
FIG. 12B is a diagram showing a state of elastic supporting members after the movable portion is shifted in the radial direction.

When the movable portion 1 is shifted a distance l to the left as shown in FIG. 3, a distance between the wall of the right-hand damper case 24R (24L) filled with the damping material 25 and the right-hand elastic supporting member 3R (3L) varies in the focus direction as shown in FIG. 12. The left-hand elastic supporting member 3L attached in the shift direction is put in a place where the amount of the damping material 25 is increased in the focus direction. Therefore, its compression by the left-hand damper case 24L is lessened, so that its spring constant Kl becomes small.

The right-hand elastic supporting member 3R attached in the direction opposite to the shift direction is put in a place where the amount of the damping material 25 is decreased. Therefore, its compression by the left-hand damper case 24L is increased, so that its spring constant Kl becomes large.

When the movable portion 1 is merely shifted in the focus direction, the amounts of the damping materials 25, which fills in between the right- and left-hand damper cases 24R and 24L and the right- and left-hand elastic supporting members 3R and 3L, are equal to each other. Therefore, the spring constants Kl and Kr are equal to each other.

When the movable portion 1 is shifted in the radial direction and then in the focus direction, forces are generated which cause the right- and left-hand elastic supporting members 3R and 3L to restore their original shape. When the movable portion is shifted from the neutral position in the focus direction by a distance X, a force Fl (=−Kl*X) acts on the fixing end of the left-hand elastic supporting member 3L (FIG. 3). Further, a force Fl (=−Kr*X) acts on the fixing end of the right-hand elastic supporting member 3R. Those forces cause respectively rotational moments about the center of gravity of the movable portion. The rotation moments are given by $$Ml=Fl*L \text{ and } Mr=Fr*R$$

where L=distance between the gravity center G and each of the elastic supporting members 3R and 3L. Therefore, the smaller the spring constant of each elastic supporting member is, the smaller the rotational moments are. On the other hand, the larger the spring constant of each elastic supporting member is, the larger the rotational moments are.

The gravity center G is located to the left when viewed from the right-hand elastic supporting member 3R, and to the right when viewed from the left-hand elastic supporting member 3L.

Therefore, the directions of the rotational moments Ml and Mr are opposite to each other. The rotational moment Mr caused by the right-hand elastic supporting member 3R is larger than the rotational moment Ml by the left-hand elastic supporting member 3L. Therefore, when the movable portion 1 is shifted in the focus (+) direction (toward the disc, the sum of the rotational moments Mr and Ml (=Mr−Ml) causes the movable portion 1 to turn in the clockwise direction. In contrast with this, when it is shifted in the focus (−) direction (apart from the disc), the movable portion 1 will turn in the counterclockwise direction.

When the movable portion 1 is shifted in the radial direction, the focus-directional drive center position on which the focus-directional drive force F acts is shifted from the gravity center G of the movable portion 1. When the movable portion 1 is shifted in the focus direction under this condition, a rotational moment Mf is generated about the gravity center: Mf=f×l, where l=shift of the focus-directional drive center position and the gravity center. The gravity center G is positioned to the left when viewed from the focus-directional drive center position on which the focus-directional drive force F acts. Therefore, when the movable portion 1 is shifted in the focus (+) direction (toward the disc), the rotation moment Mf causes the movable portion 1 to turn in the counterclockwise direction. When it is shifted in the focus (−) direction (apart from the disc), the rotation moment Mf causes the movable portion 1 to turn in the clockwise direction.

The rotational moment (Mr−Ml) is opposite in direction o the rotational moment Mf. Therefore, the former cancels out the latter. Therefore, if the rotational moment (Mr−Ml) is selected to be equal to or slightly smaller or larger than the rotational moment Mf, when the movable portion 1 is simultaneously shifted in both the focus and radial directions, the rotational moment is extremely small and hence a tile of the movable portion is 0 or approximate to 0.

EXAMPLE

Figure 13:
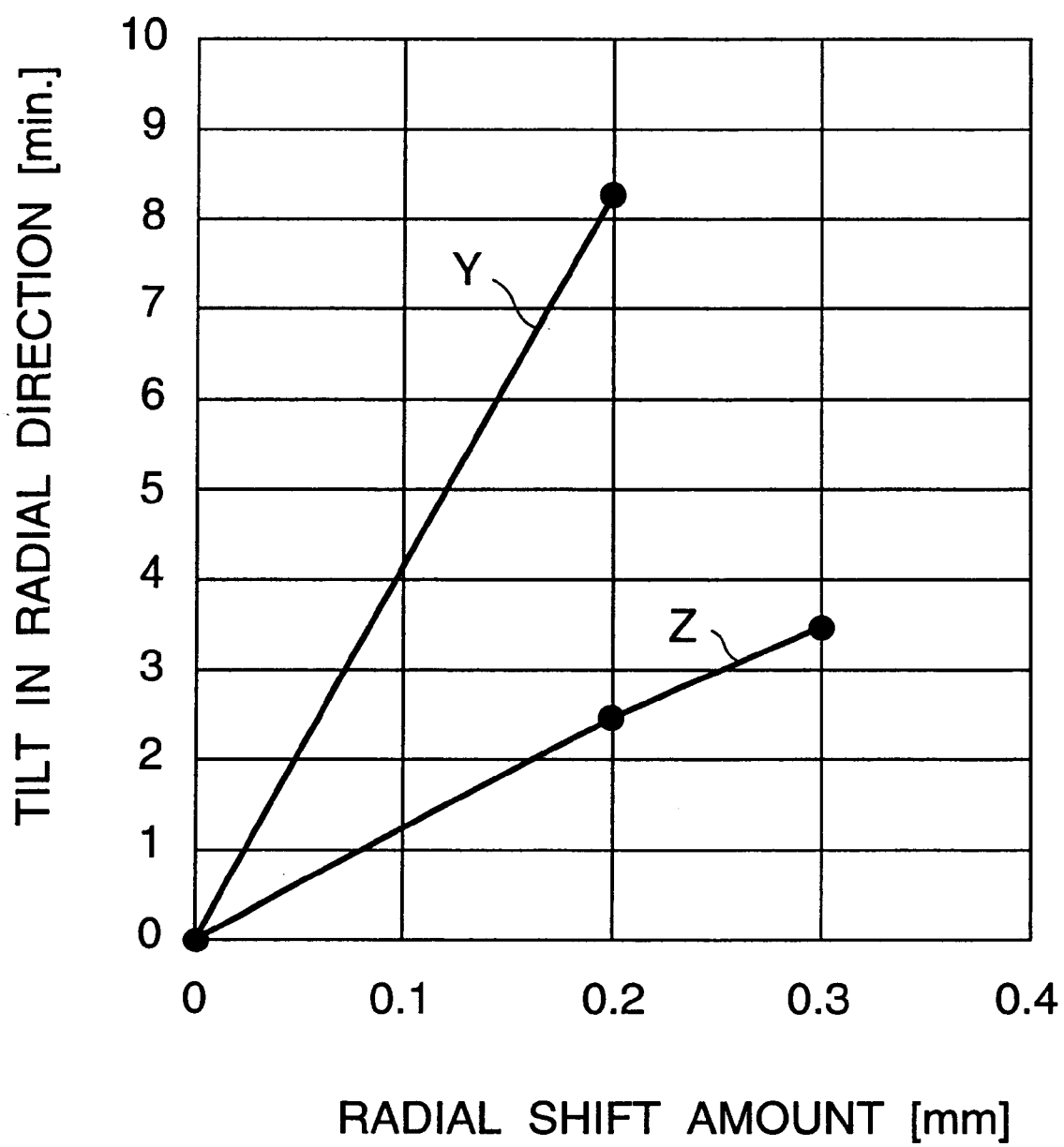
FIG. 13 is a graph showing a radial-directional tilt of the movable portion when the movable portion is shifted in the radial direction and shifted a distance of +0.4 mm in the focus direction.
Figure 14A:
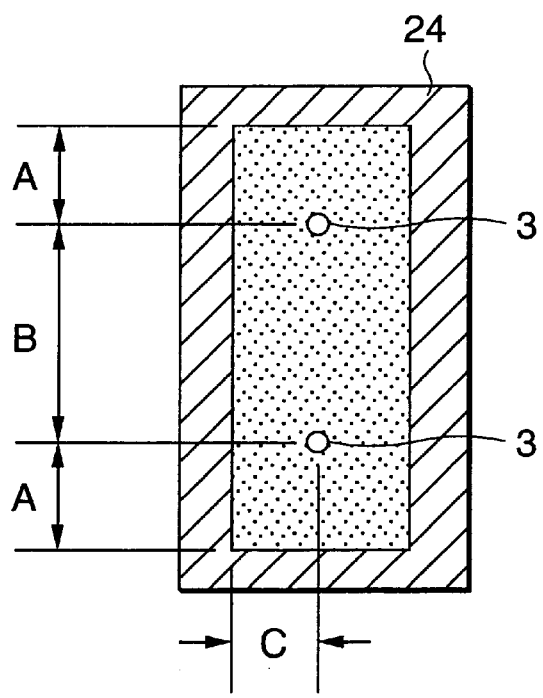
FIG. 14A is a diagram showing a conventional damper case.
Figure 14B:
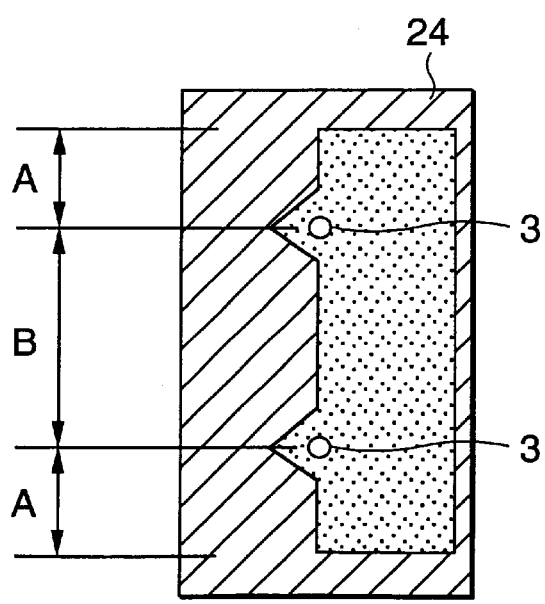
FIG. 14B is a diagram showing a damper case used in the third embodiment of the present invention.
Figure 15:
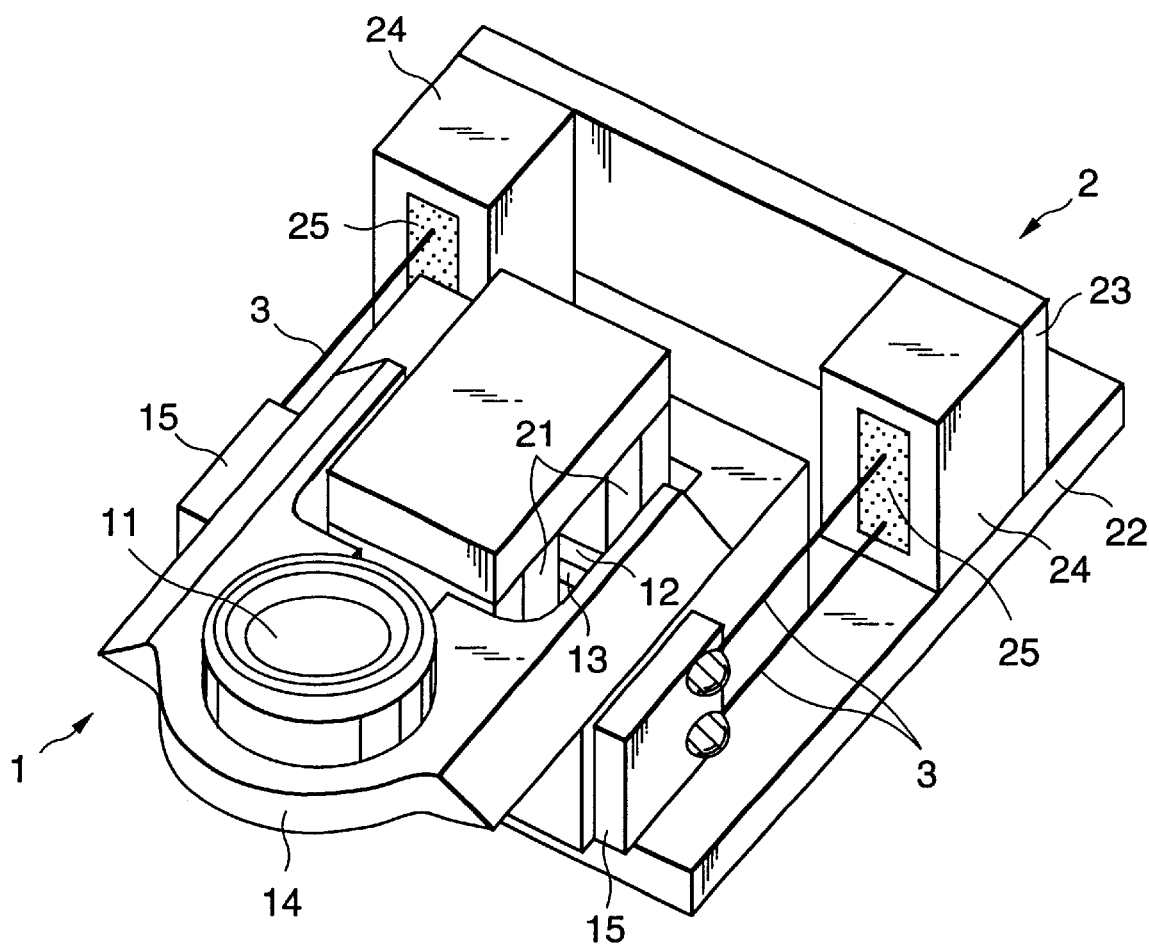
FIG. 15 is a perspective view showing a conventional objective lens driver.
Figure 16:
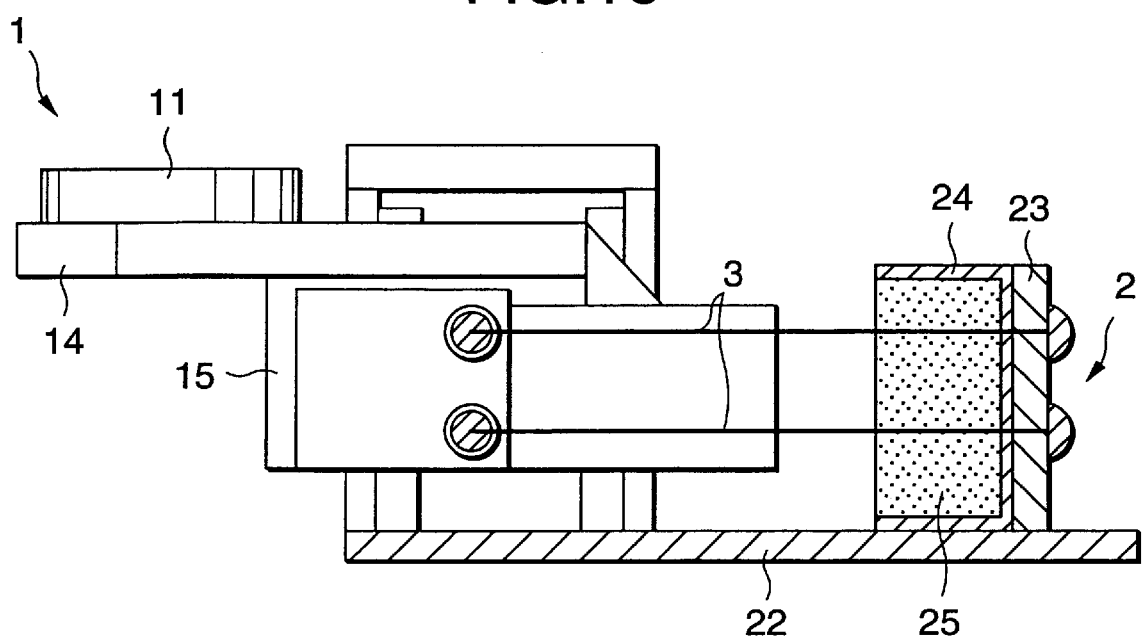
FIG. 16 is a cross sectional view showing the mounting of elastic supporting members in the conventional objective lens driver.

A radial directional tilt of the movable portion 1 caused when the movable portion is shifted in the radial direction, and then shifted a distance of +0.4 mm in the focus direction, is shown in FIG. 13. In the figure, Y indicates a conventional objective lens driver and X indicates an objective lens driver by the invention. A sample constructed by the conventional technique is shown in FIG. 14A. In the sample, the depth of the damper case 24 was 2.0 mm. An elongated hole of 1.8 mm wide and 3.45 mm high was formed in the damper case 24. Elastic supporting members 3 are located within the elongated hole while being spaced at intervals A (=0.65 mm), B (=2.15 mm) and C (=1.0 mm). Another sample constructed according to the present invention is shown in FIG. 14B. In the sample, the depth of the damper case 24 was 2.0 mm. An elongated hole of 0.95 mm wide and 3.45 mm high was formed in the damper case 24. V-shaped grooves are formed in the inner left surface of the elongated hole while being spaced at intervals A (=0.65 mm) and B (=2.15 mm). Elastic supporting members 3 are located within those V-shaped grooves, respectively. Each elastic supporting member 3 was 90 μm in diameter and 9.0 mm long. A distance between the right and left elastic supporting members 3 was 9.6 mm. Damping material loaded into the damper case 24 was silicone gel.

As seen from the graph of FIG. 13, in the conventional driver, a radial-directional tilt is 8.2 arcmin when the radial shift is 0.2 mm, while it is 2.5 arcmin in the driver of the invention. The tilt is greatly reduced in the invention driver.

In the objective lens driver of the invention, with a mere modification of the damper case, the rotation moment generated about the gravity center is sufficiently reduced even if the movable portion is shifted simultaneously in both the radial and focus directions. Therefore, the tilt of the movable portion 1 is reduced to 0 or extremely reduced while not making the magnetic circuit complicated, and hence no coma is produced and the jitter of the readout signal is improved.

Description has been made about the objective lens driver in which the movable portion with the objective lens is supported on the fixed portion in a cantilever fashion by two pairs of elastic supporting members. Those elastic supporting members are disposed on both sides of the objective lens such that each pair of elastic supporting members are vertically arranged as the upper and lower elastic supporting members on each side of the objective lens, and the upper elastic supporting members of those pairs of the elastic supporting members are horizontally spaced from each other. It is readily understood that the invention is applicable to the objective lens driver in which the movable portion is supported on the fixed portion in a cantilever fashion by two trios of elastic supporting members. Those elastic supporting members are disposed on both sides of the objective lens such that each trio of elastic supporting members are vertically arranged as the upper, middle and lower elastic supporting members on each side of the objective lens, and the upper elastic supporting members of those pairs of elastic supporting members are spaced from each other horizontally. While the movable portion is supported on the fixed portion in a cantilever fashion in the above-mentioned embodiment, the former may be supported at both ends with the latter.

As seen from the foregoing description, the present invention may be defined by an objective lens driver in which a movable portion with an objective lens is supported on a fixed portion by two groups of elastic supporting members which are disposed on both sides of the objective lens such that each group of elastic supporting members are vertically arranged on each side of the objective lens, and the upper elastic supporting members of the groups of elastic supporting members are spaced from each other horizontally, the manufacturing method wherein when the movable portion is shifted in the radial direction, the spring constants of the elastic supporting members are varied. Forces causing elastic supporting members to restore their original shape are generated when the movable portion is shifted in the focus direction. Those forces act on the movable portion and generate rotational moments about the gravity center of the movable portion. The rotational moments cancel out a rotational moment generated when the focus-directional drive center position is shifted from the gravity center. Therefore, the tilt of the movable portion 1 is reduced to 0 or extremely reduced while not making the magnetic circuit complicated, and hence no coma is produced and the jitter of the readout signal is improved.

What is claimed is:

1. An objective lens driver comprising:

a movable portion with an objective lens;

at least four elastic supporting members being fixedly attached at first ends thereof to said movable portion while being vertically and horizontally arranged with respect to said objective lens;

a fixed portion to which second ends of said elastic supporting members are fixedly attached; and damper cases provided at said fixed portion, in which damping material is being filled, wherein when said movable portion is shifted in a radial direction, a first amount of said damping material loaded between said damper cases and said elastic supporting members on a first side of said objective lens is different from a second amount of said damping material loaded between said damper cases and said elastic supporting members on a second side of said objective lens.

2. The objective lens driver according to claim 1, wherein said damper cases on said first and second sides of said objective lens are bilaterally symmetrical with each other.

3. An objective lens driver comprising:

a movable portion with an objective lens;

at least four elastic supporting members being fixedly attached at first ends thereof to said movable portion while being vertically and horizontally arranged with respect to said objective lens;

a fixed portion to which second ends of said elastic supporting members are fixedly attached; and damper cases provided at said fixed portion, in which damping material is being filled, wherein a portion of each case of said damper cases, at which said elastic supporting member is to be placed, is configured such that an inner side of said portion narrows in a focus direction, and an outer side thereof expands in said focus direction.

4. The objective lens driver according to claim 3, wherein said portion of each case of said damper cases, at which said elastic supporting member is to be placed, is configured so as to be laterally V-shaped.

5. The objective lens driver according to claim 4, wherein said damper cases on first and second sides of said objective lens are bilaterally symmetrical with each other.

6. An objective lens driver comprising:

a movable portion with an objective lens;

at least four elastic supporting members being fixedly attached at first ends thereof to said movable portion while being vertically and horizontally arranged with respect to said objective lens;

a fixed portion to which second ends of said elastic supporting members are fixedly attached; and damper cases provided at said fixed portion, in which a damping material is being filled, wherein when said movable portion is shifted in a radial direction, a first distance between a wall of each case of said damper cases and said elastic supporting members in a focus direction on a first side of said objective lens is different from a second distance between a wall of each case of said damper cases and said elastic supporting members in a focus direction on a second side of said objective lens.

7. The objective lens driver according to claim 6, wherein said damper cases on said first and second sides of said objective lens are bilaterally symmetrical with each other.

* * * * *